Jan. 29, 1952   D. P. REYNOLDS   2,583,593
DIPPING FORM
Filed Jan. 3, 1949   3 Sheets-Sheet 1

INVENTOR.
DANIEL P. REYNOLDS
BY
Oldham & Oldham
ATTORNEYS

Jan. 29, 1952  D. P. REYNOLDS  2,583,593
DIPPING FORM
Filed Jan. 3, 1949  3 Sheets-Sheet 2
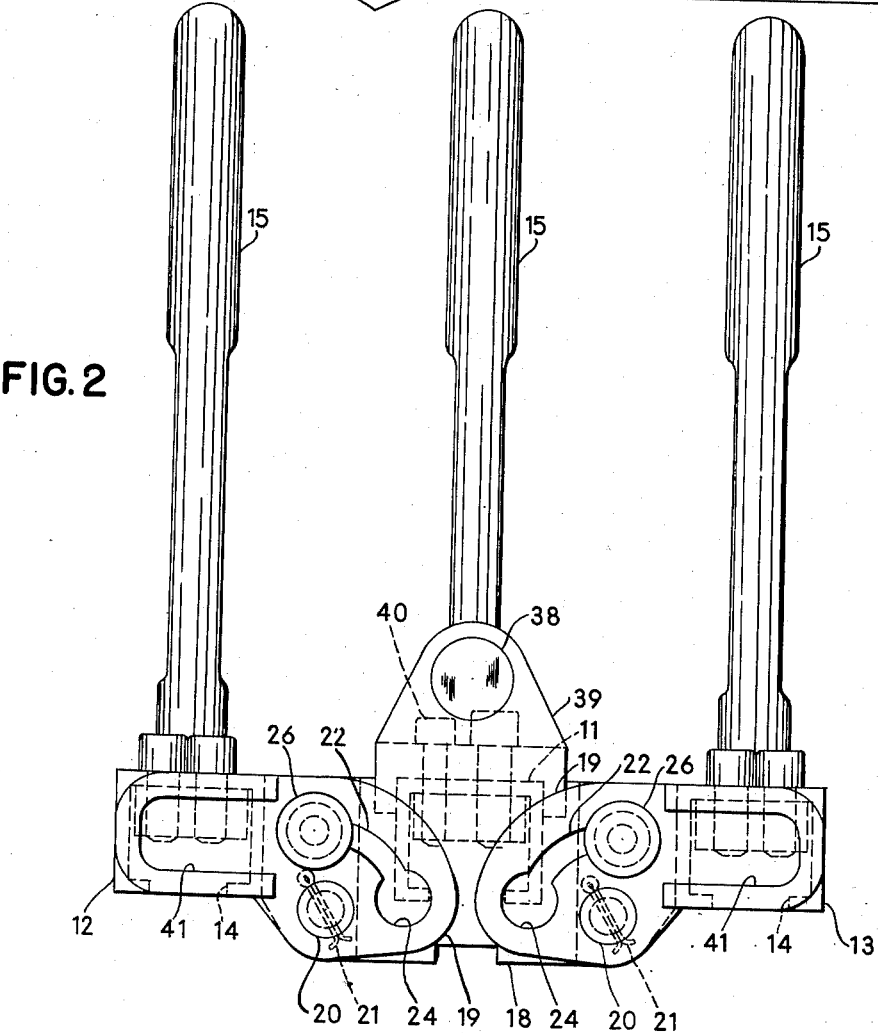
INVENTOR.
DANIEL P. REYNOLDS
BY
Oldham & Oldham
ATTORNEYS

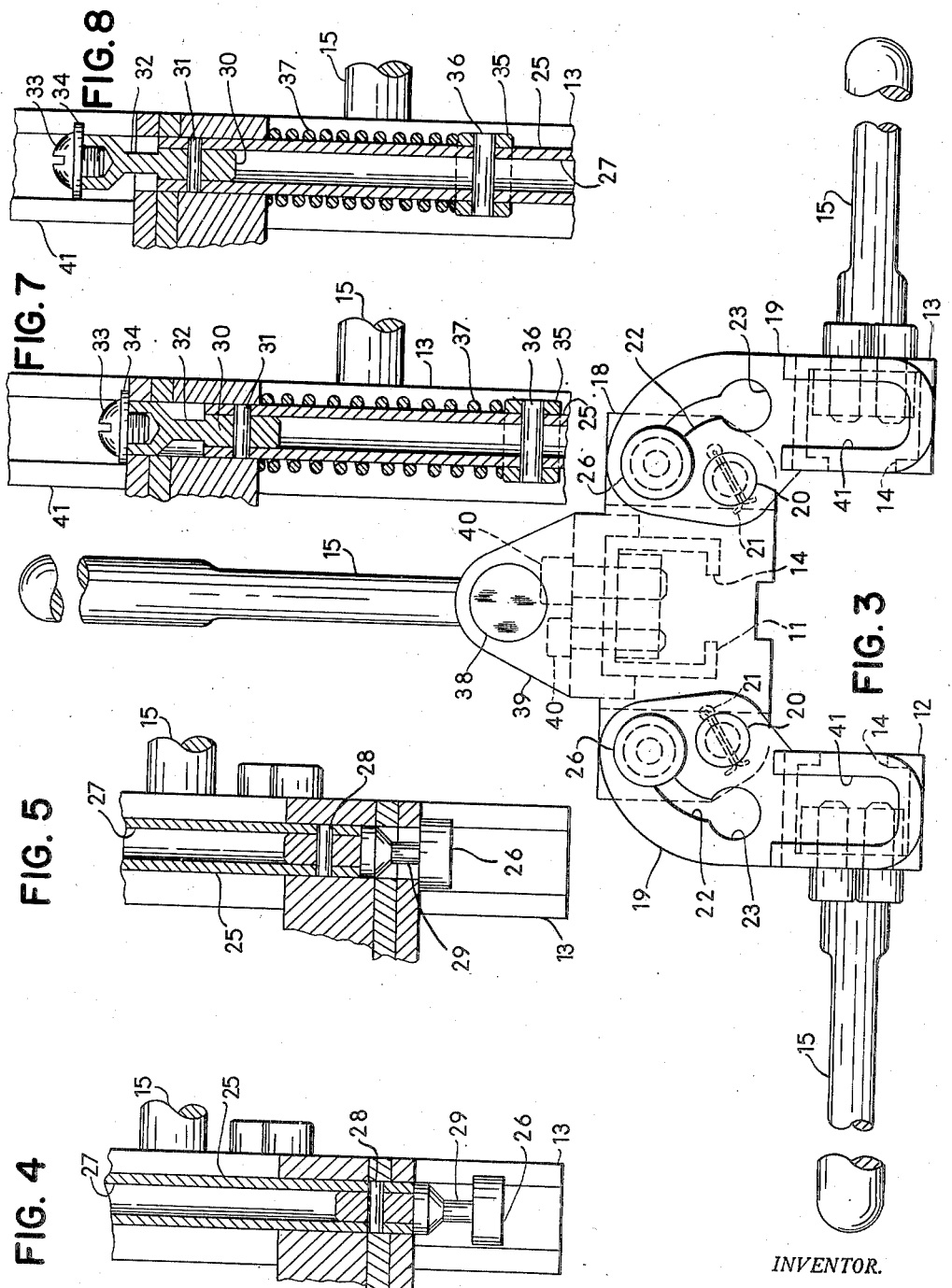

Patented Jan. 29, 1952

2,583,593

UNITED STATES PATENT OFFICE 2,583,593

DIPPING FORM

Daniel P. Reynolds, Massillon, Ohio

Application January 3, 1949, Serial No. 68,829

12 Claims. (Cl. 18—41)

This invention relates to dipping forms, especially to a compact form used in producing a large number of small articles from a liquid material by dipping the form into same.

Heretofore there have been a variety of types of automatic machines made for the production of different types of dipped articles. Still a greater variety of different types of forms have been provided for use in the manufacture of dipped articles. All such dipping machines known to me have employed relatively large dipping tanks and have formed the desired articles at a fairly rapid rate. However, the machines have been relatively costly and bulky in relation to the size and number of articles produced.

The general object of the present invention is to produce dipped articles at an increased speed of production and to utilize a dipping form carrying a multiplicity of elongate molds thereon which is characterized by its compactness and by its ability to expose different portions of the form for removal of articles from the individual molds on different portions of the form.

Another object of the invention is to provide a multiple type of a mold positioning form which will automatically open and close movable portions of the form dependent upon the positioning of same.

A further object of the invention is to provide a multiple mold wherein the movable portions of the form have limited movement and are positively positioned in desired relationship to the remainder of the mold form.

Yet another object of the invention is to provide a mold form to facilitate rapid production of large numbers of small dipped articles in a small dipping tank.

Still another object of the invention is to provide an inexpensive, uncomplicated multiple type mold form which is adapted to have a long service life with a minimum of maintenance.

The foregoing and other objects and advantages of the invention will be made apparent as the specification proceeds.

In this specification, the manufacture of dipped goods is referred to and the form of the invention can be used in any manufacture of this type. One example of the use of the form is in the production of toy balloons wherein a natural rubber latex or other suitable dipping material is prepared and is retained in a tank into which the mold form is introduced for deposit of rubber or other material on molds carried by the mold form to produce the desired articles.

For a better understanding of the present invention reference should be had to the accompanying drawings wherein:

Fig. 2 is an end elevation of the form of Fig. 1;

Fig. 3 is a further end elevation of the dipping form showing it in its open position;

Figure 1:
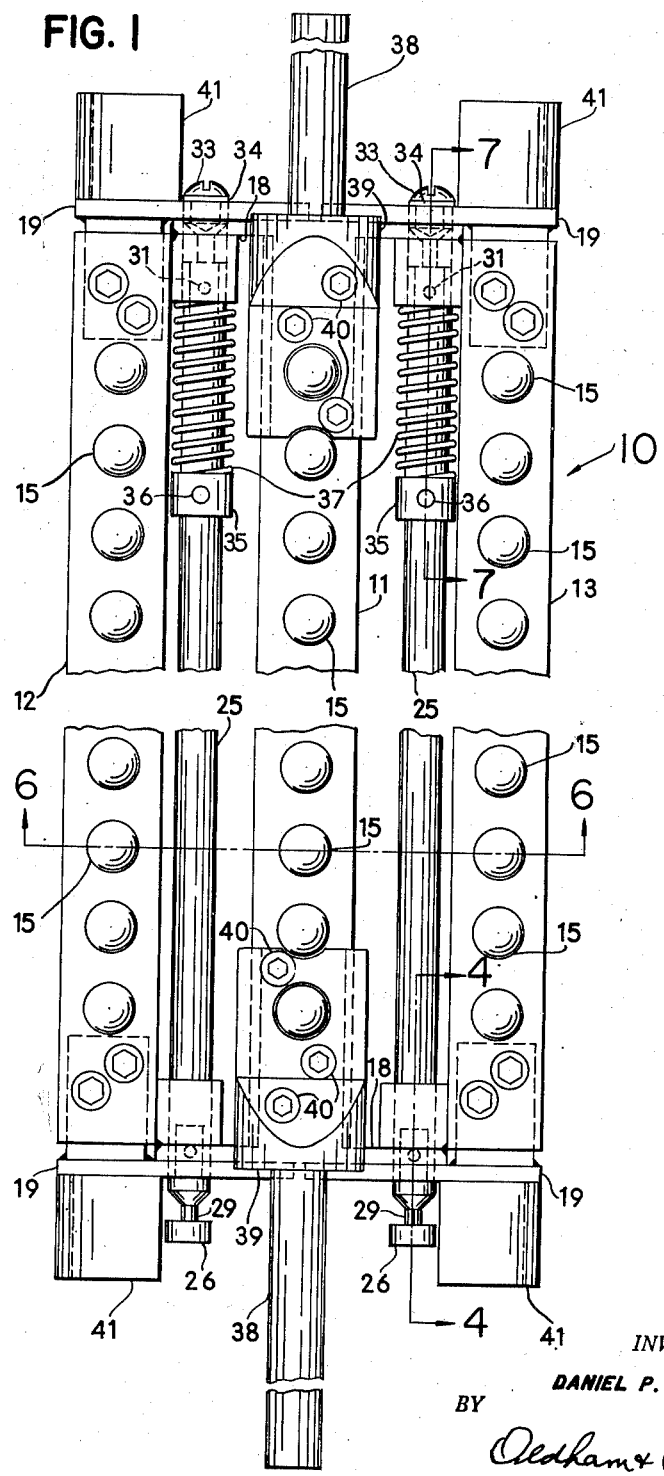
Fig. 1 is the bottom plan of a dipping form embodying the principles of the invention.

Figs. 4, 6 and 7 are sectional views taken on lines 4—4, 6—6 and 7—7 of Fig. 1; and Figs. 5 and 8 are fragmentary sections similar to Figs. 4 and 7, respectively, illustrating the released position of the lock device of the invention.

Generally speaking, the present invention relates to a multiple type of a dipping form wherein two elongated forms are provided each of which carries a multiplicity of elongated molds extending therefrom in a common direction and in parallel relationship to each other. One of the frames is pivotally carried by the other frame and such movable frame can be swung from a position with its molds adjacent and parallel to the molds on the first frame and to a position normal to and remote from the molds on such first frame. Lock means are provided for releasably positioning the removable frame in a desired position.

Reference now is made to the details of the structure shown in the accompanying drawings and corresponding numerals relate to corresponding parts in the specification and drawings.

A multi-section dipping form 10 is shown in the drawings and it includes a center frame 11 and edge frames 12 and 13. Each of the frames 11 through 13 is, preferably, of substantially hollow, box-like shape and section and has an opening 14 in its lower surface, as portrayed in Fig. 6 of the drawings. Each of the frames 11, 12 and 13 positions a plurality of elongate molds 15 which extend therefrom in a common direction. Usually the frames have holes formed in the upper surfaces thereof and threaded studs 16 formed on the ends of the molds 15 extend through the holes formed in the frames and engage with nuts 17 whereby the molds are removably secured to the form 10. Figs. 1 and 2 of the drawings best show that the frames 11, 12 and 13 are positioned adjacent to each other and that the molds 15 likewise are in relatively close association both laterally and longitudinally of the form 10.

As a salient feature of the present invention, the edge frames 12 and 13 are pivotally carried by the center frame 11 so that the molds 15 positioned by the edge frames can be swung outwardly of the dipping form to expose all of the molds positioned by the dipping form for action thereon by other means, such as automatic mold stripping devices. To this end, usually separate end plates, end frames or blocks 18 are secured to each end of the center frame 11 and protrude laterally therefrom. A support plate 19 is also shown secured to each end of the edge frames 12 and 13 and extending inwardly of the dipping form from such edge frame members. The support plates 19 may be secured to the edge frames 12 and 13 in any desired manner but are pivotally secured to the end plates 18 by means of rivets or pins 20. The pins 20 are shown as extending through the support plates 19 and the end plates 18 and carrying cotter pins 21 on their inner ends to retain such pins 20 in position. Thus the pins 20 position the edge frames 12 and 13 for pivotal movement with relation to the center frame 11 and such movement of the edge frames is limited by lock means associated with the dipping form 10. Such lock means are shown as including arcuate slots 22 with one slot being formed in each of the support plates 19 and extending in a direction inwardly and downwardly of the form 10 when the edge frames are positioned as shown in Fig. 2. Each of the slots 22 is provided with enlarged end portions 23 and 24 for a purpose to be hereinafter described. Locking rods or tubes 25 are provided on the form 10 at the laterally outer portions of the end plates 18 with such tubes 25 extending the length of the form 10. The diameter of such locking rods or tubes 25 is such that it will only engage with the enlarged end portions 23 and 24 of the slots 22. These locking tubes 25 extend completely through the support plates 19 and are snugly received in the holes provided therefor in the end plates whereby the tubes are positioned in the dipping form for longitudinal movement.

The locking tubes 25 each carry a knob 26 at one end thereof. These knobs 26 extend into bores 27 of the locking tubes and are secured therein by means of pins 28 which extend diametrically through the tubes 25 and the portion of the knob 26 positioned therein. The knobs 26 each have reduced diameter sections 29 formed adjacent the ends thereof, which sections 29 are of such size as to pass through the complete length of the slots 22. Usually separate locking cylinders 30 are engaged with the opposite ends of the locking tubes 25 for actually effecting the desired locking action in combination with the knobs 26. Again, a portion of each locking cylinder 30 extends into the bore 27 of each tube 25 and is secured therein by a diametrically extending pin 31. Each locking cylinder 30 has a reduced diameter section or zone 32 provided therein of the same size as the section 29 for engagement with and passage through the complete length of the slots 22 with which the sections 32 are adapted to be associated. Usually the locking cylinders 30 have enlarged end portions to serve as stops and cap screws 33 are shown engaging with the outer ends of the cylinders 30 for retaining stop discs 34 in engagement therewith to prevent complete passage of the cylinders 30 through the slots 22 or engaged end portions thereof.

The locking tubes 25 are normally biased longitudinally of the dipping form in such a direction as to urge the normal diameter portions of the locking tubes 25, knobs 26 and locking cylinders 30 into engagement with the enlarged end portions 23 and 24 of the slots 22. Thus a collar 35 is secured to each locking tube 25 adjacent the end thereof carrying the locking cylinder 30 and a pin or rivet 36 may secure the collar in position. A resilient coil spring 37 is shown in telescoped engagement with each locking tube 25 intermediate the collar 35 secured thereto and the adjacent plate 18 whereby such coil spring will normally urge such end of the tube to its innermost position in the dipping form. At such position the normal diameter portions of the locking tubes 25, knobs 26, and locking cylinders 30 are engaged with the enlarged ends of the slots 22 whereby arcuate movement of the edge frames 12 and 13 is prevented. However, a slight pressure exerted upon the knobs to push them axially inwardly of the dipping form will release the edge frames for pivotal movement, as permitted by the slots 22.

Of course the slots 22 are formed of such an arc that they correspond to the movement of the edge frames 12 and 13 permitted by the pins 20 that pivotally secure such edge frames to the center frame.

Figs. 1 to 3 show that support rods 38 may be provided at each end of the form 10 and be secured thereto by brackets 39 to which such rods engage or are formed integrally therewith. Cap screws 40 secure the brackets 39 to the center frame 11. The dipping form 10 will normally be secured to a conveyor or other similar apparatus by means of the rods 38 so that the dipping form can be pivotally positioned on such support device with the molds 15 extending either downwardly of the form 10, or upwardly therefrom as desired, depending upon the use of the form at the time. The drawings also indicate that extension sections 41 may be secured to each end of the edge frames 12 and 13, which sections may be substantially U-shaped in section and with the open ends of the sections 41 extending inwardly of the apparatus as shown positioned in Fig. 2. Such sections 41 may be used in controlling the positions of the edge frames 12 and 13 in the dipping form. Normally in using the dipping form 10 the molds 15 will extend downwardly therefrom for a dipping operation. However, after the dipping operation the molds are in many instances inverted for drying of deposited material thereon. It will be noted that Fig. 2 shows the dipping form in its inverted position and it will be seen that the center of gravity of the edge frames 12 and 13 and the molds positioned thereby is positioned laterally outwardly of the form 10 from the center frame 11 with relation to the pins 21 by which the edge frames are positioned. Thus as soon as the locking tubes 25 are moved axially of the dipping form to release the edge frames, gravity will automatically swing or pull such edge frames to their other extremity of movement, as illustrated in Fig. 3 wherein both sides of all molds carried by the form 10 are completely exposed and mold strip devices can easily be associated with all of the molds to strip articles therefrom. Such automatic mold opening action is facilitated due to the fact that the end portions 23 of the slots 22 are also positioned slightly laterally outwardly of the dipping form with relation to the pins 20. Likewise, when the form 10 is placed in its normal upright position, and the locking tubes 25 release the edge frames 12 and 13 they will again automatically swing downwardly of the form and will be locked in desired position adjacent the center frame 11. The coil springs 37 urge the locking tubes 25 and associated means into locking position so that the locking tubes only need be depressed temporarily to start movement of the edge frames and associated means in both instances in the desired direction, and the edge frames will be locked into their new positions when the enlarged end portions of the slots are engaged by the locking means provided.

It will be appreciated that different specific constructions of the locking means disclosed herein may be used without deviating from the principles of the invention since in some instances it may be desired to lock one end of each edge frame in a position so that even some type of a set screw device could be provided on one end of each edge frame for association with a portion of the center frame for retaining the edgeframe in desired relationship thereto. Also, the number of frame sections may be varied, as desired, although three mold sections produce a particularly efficient type of apparatus. It also will be appreciated that the specific locking means shown in association with the locking tubes 25 may be varied widely by forming such reduced sections integrally with the tubes, if desired, and also by making the stop discs 34 integral with such tubes. Other types of spring means may be used in place of the coil springs 37 without changing the function of such devices.

It will be noted that the locking action for the movable frames in their extremities of position occurs automatically. Also, the lock action may be effected at only one end of the frame. The support rods 38 are adapted to engage with a conveyor and permit the form 10 to be suspended therefrom or to be swung thereabove depending upon the action desired.

While one embodiment of the invention has been disclosed herein, it will be appreciated that modification of this particular embodiment of the invention may be resorted to without departing from the scope of the invention as defined by the appended claims.

Having thus described my invention, what I claim is:

1. A dipping form comprising a center frame, a pair of edge frames one of which is adjacent each side of said center frame, a plurality of elongate molds secured to each of said frames and extending therefrom in parallel relation, an end frame secured to each end of said center frame, a pair of support plates having arcuate slots of substantially ninety degrees in length with enlarged ends therein associated with each of said end frames with one plate adjacent each lateral margin of such frame, a pivot pin engaged with each of said support plates and said end frames to secure said support plates pivotally to the form, said pivot pins being positioned below said slots with each slot extending upwardly and outwardly of the apparatus when same is inverted with the said edge frames adjacent said center frame and with such pins being closer to the longitudinal centerline of the form than the upper ends of said slots, a uniform normal diameter lock rod extending between said support plates and engaged with said end frames and said slots in said support plates, said lock rods having reduced diameter zones adjacent each end thereof in the portion of same engaged with said slots and which are adapted to engage with any portion of said slots, the normal diameters of said rods being adapted to engage only the enlarged ends of said slots, stop means carried by said lock rods adjacent one end of each rod, and resilient means compressed between said stop means and said end frame thereadjacent to urge said rods in one direction and normally seat a normal diameter portion of same in the enlarged ends of said slots to lock the edge frames in a given position, said pivot pins, slots and lock rods being adapted to permit individual arcuate movement of said edge frames to positions more remote from said center frame and with the molds carried thereby extending substantially normally to the molds carried by said center frame upon compression of said resilient means by longitudinal movement of said lock rods to release said support plates.

2. A dipping form comprising a center frame, a pair of edge frames one of which is adjacent each side of said center frame, a plurality of elongate molds secured to each of said frames and extending therefrom in parallel relation, an end frame secured to each end of said center frame, a pair of support plates having arcuate slots of substantially ninety degrees in length with enlarged ends therein associated with one of said end frames with one plate adjacent each lateral margin of such frame, a pivot pin engaged with each of said support plates and said end frame to secure said support plates to the form, said pivot pins being positioned below said slots with each slot extending upwardly and outwardly of the apparatus when same is inverted with the said edge frames adjacent said center frame and with such pins being closer to the longitudinal centerline of the form than the upper ends of said slots, a pair of lock rods engaged with said one end frame and with one of said rods extending through each of said slots in said support plates, said lock rods having reduced diameter portions in the section of same engaged with said slots and which are adapted to engage with any portion of said slots, the normal diameters of said rods being adapted to engage only the enlarged ends of said slots, resilient means associated with said rods and said end frames to urge said rods in one axial direction and seat a normal diameter portion of same in the enlarged ends of said slots to lock the edge frames in given positions, said pivot pins, slots and lock rods being adapted to permit individual arcuate movement of said edge frames to positions more remote from said center frame and with the molds carried thereby extending substantially normally to the molds carried by said center frame.

3. A dipping form comprising a center frame, a pair of edge frame one of which is adjacent each side of said center frame, a plurality of elongate molds secured to each of said frames and extending therefrom in parallel relation, an end frame secured to each end of said center frame, a pair of support plates having arcuate slots of substantially ninety degrees in length with enlarged ends therein associated with each of said end frames with one plate adjacent each lateral margin of such frame, a pivot pin engaged with each of said support plates and said end frames to secure said support plates to the form, said pivot pins being positioned below said slots with each slot extending upwardly and outwardly of the apparatus when same is inverted with the said edge frame adjacent said center frame and with such pins being closer to the longitudinal centerline of the form than the upper ends of said slots, a lock rod extending between and engaged with said end frames and the upper ends of said slots in said support plates, said lock rods having limited longitudinal movement in the form, said lock rods having reduced diameter means adjacent each end thereof in the portion of same adapted to be engaged with said slots and which are of such size to permit engagement with any portion of said slots, the normal diameters of said rods being adapted to engage only the enlarged ends of said slots, and resilient means associated with said lock rods and said end frames to urge said rods in one direction and seat a normal diameter portion of same in the enlarged ends of said slots to lock the edge frames in a given position, said edge frames automatically moving arcuately outwardly of the form when it is inverted and said lock rods are released.

4. A dipping form comprising a plurality of elongated frames positioned in spaced but parallel relation, an end frame fixedly secured to each end of one of said frames, a support plate pivotally secured to each of said end frames, a second one of said elongated frames being secured to and extending between said support plates, one of said support plates having an arcuate slot formed therein with enlarged end sections, said arcuate slot conforming to the relative movement between said support plates and said end frames, a locking pin engaged with said end frame and having a reduced diameter section adapted to slide freely in the arcuate slot in said support plate, and means positioning said locking pin for limited longitudinal movement relative to said elongated frames, the normal diameter portion of said pin being of such size to permit it to engage with said enlarged ends of said slots only and prevent arcuate movement of said support plate, said support plates having pivot means securing same to said end frames, said pivot means and slots being relatively positioned to permit arcuate movement of said second frame outwardly from said first frame.

5. A form as in claim 4 wherein said second frame is secured to said first frame with its center of gravity laterally outwardly of the form beyond said pivot means whereby upon inversion of the form and release of said locking pin, said second frame automatically swings outwardly of the said first frame.

6. A dipping form comprising a plurality of elongated frames positioned in spaced but parallel relation, an end frame fixedly secured to each end of one of said frames, a support plate pivotally secured to each of said end frames, another one of said elongated frames being secured to and extending between said support plates, one of said support plates having an arcuate slot formed therein with enlarged end sections, a locking pin engaged with said end frame and having a reduced diameter section adapted to slide freely in the arcuate slot in said support plate, and means positioning said locking pin on the one of said end frames adjacent said slotted support plate for limited longitudinal movement, said locking pin engaging said slot, and the normal diameter portion of said pin being of a size to engage only with the enlarged ends of said slot and prevent arcuate movement of said support plate.

7. A form for use in producing a large number of dipped rubber articles in a small space comprising a main frame and an edge frame, a plurality of molds secured to each of said frames and extending therefrom in the same direction and parallel to each other, end plates secured to one of said frames and extending transversely therefrom, pin means engaging said end plates and pivotally securing said edge frame to said main frame so that the frames can be moved arcuately to and from positions immediately adjacent each other, said edge frame having an arcuate slot formed therein in the same arc as the relative movement of said frames, and lock means carried by said main frame and engaged with said slot to limit relative arcuate movement between said main and edge frames, said lock means being adapted to engage said edge frame means to secure said edge frame in a desired position with relation to said main frame.

8. A form for use in producing a large number of dipped rubber articles in a small space comprising a main frame and an edge frame, a plurality of molds secured to each of said frames and extending therefrom parallel to each other, end sections associated with said main frame, pin means engaged with said end sections and pivotally securing said edge frame to said main frame so that said frames can be moved to and from positions immediately adjacent each other, said edge frame having an arcuate slot formed therein, and lock means secured to said end sections and engaged with said slot to limit relative arcuate movement between said main and edge frames, said lock means being adapted to retain said edge frame in a desired position.

9. A form for use in producing a large number of dipped rubber articles in a small space comprising a main frame and an edge frame, a plurality of molds secured to each of said frames and extending therefrom in the same direction parallel to each other, pin means pivotally securing said edge frame to said main frame so that said frames can be moved arcuately to and from positions immediately adjacent each other, one of said frames having an arcuate slot formed therein, and a protuberance extending from said other frame and extending through said slot to limit relative movement between said frames, said edge frame having its center of gravity positioned laterally outwardly of the form on the opposite side of said pin means from said main frame whereby said edge frame can be moved by gravity with relation to said main frame.

10. A form for use in producing a large number of dipped rubber articles in a small space comprising a main frame and an edge frame, a plurality of molds secured to each of said frames and extending therefrom in the same direction parallel to each other, said frames being of substantially the same length and one frame having laterally offset end portions extending to a point adjacent the ends of the second frame, pin means pivotally securing said frames together, said frames being free for pivotal movement away from and then back towards each other, and cooperating lock means operatively associated with said end portions and said second frame for securing said frames in given relative positions and including an arcuate slot formed in one of said end portions and a protuberance carried by said second frame and engaged with said slot to limit relative movement between the said frames.

11. A frame as in claim 10 wherein said second frame is secured to said one frame with its center of gravity outwardly of the form with relation to said one frame and said pin means whereby when said form is inverted said second frame will automatically swing outwardly of the form a limited amount when said lock means are released.

12. A dipping form comprising a plurality of elongated frames positioned in spaced but parallel relation, an end plate fixedly secured to each end of one of said frames, a support plate pivotally secured to each of said end plates, another one of said elongate frames being secured to and extending between said support plates, one of said plates having an arcuate slot formed therein with enlarged end sections, and locking means operatively associated with said plates for limited longitudinal movement with relation thereto and adapted to be snugly engaged with the enlarged end sections of said slot at predetermined portions of its longitudinal movement to prevent arcuate movement between said elongated frames.

DANIEL P. REYNOLDS.

REFERENCES CITED

The following references are of record in the file of this patent:

UNITED STATES PATENTS

| Number | Name | Date |
|---|---|---|
| 1,534,758 | Bartholomew | Apr. 21, 1925 |
| 1,593,279 | Wagenhorst | July 20, 1926 |
| 2,351,202 | Hahne | June 13, 1944 |